United States Patent [19]

Hultén et al.

[11] Patent Number: 5,916,447
[45] Date of Patent: Jun. 29, 1999

[54] METHOD FOR WATER TREATMENT

[75] Inventors: Felix Hultén, Västra Frölunda; Göran Sivertsson, Kungsbacka, both of Sweden

[73] Assignee: Eka Chemicals AB, Bohus, Sweden

[21] Appl. No.: 08/948,231

[22] Filed: Oct. 15, 1997

Related U.S. Application Data

[60] Provisional application No. 60/030,538, Nov. 7, 1996.

[30]    Foreign Application Priority Data

Oct. 15, 1996  [SE]  Sweden ................... 9603775

[51] Int. Cl.⁶ ..................................... C02F 1/52
[52] U.S. Cl. .................. 210/709; 210/716; 210/738; 252/175; 423/493; 423/558
[58] Field of Search .................... 210/702, 716, 210/717, 723, 724, 738, 709; 252/175; 423/493, 558

[56]           References Cited

U.S. PATENT DOCUMENTS

| | | | |
|---|---|---|---|
| 3,929,666 | 12/1975 | Aiba et al. | 252/317 |
| 4,051,028 | 9/1977 | Fiessinger | 210/716 |
| 4,402,851 | 9/1983 | Lindahl | 252/181 |
| 4,485,018 | 11/1984 | Fiessinger et al. | 210/716 |
| 4,981,673 | 1/1991 | Boutin et al. | 423/556 |
| 5,171,453 | 12/1992 | Communal | 210/726 |

FOREIGN PATENT DOCUMENTS

| | | |
|---|---|---|
| A464517 | 8/1975 | Australia . |
| 2436124 | 2/1976 | Germany . |
| 49053195 | 5/1974 | Japan . |
| WO94/00390 | 1/1994 | WIPO . |
| WO95/23765 | 9/1995 | WIPO . |

OTHER PUBLICATIONS

A. Leprince et al., "Polymerized Iron Chloride: An Improved Inorganic Coagulant", *Research & Technology*, Oct. 1984, pp. 93–97.

H.X. Tang et al., "Inorganic Polymer Flocculant Polyferric Chloride, Its Properties, Efficiency and Production," in *Chemical Water and Waste Water Treatment III*, Ed. R. Klute and H.H. Hakin, Springer Verlag, 1994, pp. 57–69.

*Primary Examiner*—Peter A. Hruskoci
*Attorney, Agent, or Firm*—Burns, Doane, Swecker & Mathis, L.L.P.

[57]            ABSTRACT

A method for treatment of water in which an aqueous solution containing a freshly made polymerised iron substance is produced, the produced polymerised iron substance is aged sufficiently long to provide for efficient treatment of water, and the aqueous solution containing aged polymerised iron substance is added to the water to be treated.

8 Claims, No Drawings

METHOD FOR WATER TREATMENT

This application 35 U.S.C. 119 of provisional application Ser. No. 60/030,538, filed Nov. 7, 1996.

The present invention relates to a method for water treatment in which an aqueous solution of a polymerised iron substance, acting as flocculent, is used to purify the water.

The general concept of using aqueous solutions of polymerised iron substances in water treatment is described, e.g. by Tang et al in "Inorganic polymer flocculant polyferric chloride, its properties, efficiency and production", Chemical Water and Waste-water treatment (III), p 57–70, Springer Verlag 1994, hereby incorporated by reference. Generally, a higher dosage of flocculant provides for better flocculation. From a technologically and economically point of view it is desirable to increase the flocculant dosages by using aqueous solutions with high concentrations of flocculant. In that way high dosages of flocculant could be added quicker, and the energy costs and wear on pumps and other pieces of equipment would be less as the solution volumes to handle would be smaller. In many instances a higher flocculant concentration also provides for a more efficient water treatment. However, as indicated by Tang et al, industrial scale applications of aqueous solutions of polymerised iron substances are associated with a serious problem, namely there great instability and aptness to precipitate, particularly when in higher concentrations. Tang et al (supra) describes a method for stabilisation of aqueous solutions of polymerised iron substances in which special stabiliser compounds are used, specifically phosphates. Such use is however associated with a number of problems: the addition of phosphates in a water purification system is undesirable from an ecological point of view; phosphate compounds are in themselves associated with costs, and like most chemicals they carry a number of practical handling problems with them.

It has now been found that one way to overcome these problems is to produce the polymerised iron substance close to the point of consumption. In that way the polymerised iron substances can be used quickly and well before precipitation. It has however also surprisingly been found that such a method should provide for efficient flocculation, i.e. the polymerised iron substance should be aged at least for some shorter period of time before being added to the water to be treated. More specifically, the present method comprises the steps of producing an aqueous solution containing a freshly made polymerised iron substance; ageing the polymerised iron substance sufficiently long to provide for efficient treatment of water, and adding the aqueous solution containing the thus aged polymerised iron substance to the water to be treated. The time of ageing is preferably at least about 15 seconds, particularly at least about half a minute, and most preferably at least about 1 minute. The minimum ageing time should preferably be adapted to the individual case, as said ageing time depends on the interaction of a number of various parameters such as the content of polymerised iron substance in the solution, among other things. It can however easily be determined by the average practitioner, for instance by measuring the turbidity or the phosphor content of the water under treatment before and after addition of polymerised iron substance. This could basically be done with any suitable standard method for measuring turbidity or phosphor content.

Suitably, the solution of polymerised iron substance is added before the substance has started to precipitate. Precipitations do usually not contribute to the efficiency of a water treatment. Rather to the contrary it often leads to clogging of pipes and other parts of the equipment. The preferred maximum ageing time applied in the present method is determined by a number of parameters such as the specific kind of polymerised iron substance, the concentration of the polymerised iron substance, temperature, and pH. It can however easily be determined by the average practitioner. The maximum time is also easy to determine: it is the point in time when precipitations are starting to form in the polymerised iron substance solution. This point in time could for instance be determined by means of turbidimetry.

One advantage of the present invention is that it may provide for efficient water treatment utilising polymerised iron substance solutions holding iron contents of as high as 3.5M or even more without having to use any stabilising agent.

A tube or a hose connecting the reactor in which the polymerised iron substance is produced with the water treatment facilities may be employed to provide for the appropriate time of ageing. By varying the dimensions of the tube and/or the flow speed of polymerised iron substance solution through the ageing time could easily be adjusted.

According to a preferred embodiment of the present invention the polymerised iron substance is polymerised iron chloride, polymerised iron sulphate, polymerised iron chloride sulphate, or a mixture thereof. Polymerised iron chloride sulphate is produced from iron chloride sulphate, which is obtainable from a reaction between chlorine and iron sulphate in an aqueous medium.

Polymerised iron substances may be produced by a number of methods, such as described by e.g. A. Leprince et al in "Polymerized iron chloride: An improved inorganic coagulant", J. AWWA, 76(10), page 93–97, 1984, hereby incorporated by reference, or by Graham and Jiang in WO 95/23765, hereby incorporated by reference. According to the present invention the polymerised iron substance is preferably produced by reacting an iron salt with alkali. The iron salt may e.g. be iron chloride, iron sulphate, iron nitrate, or iron perchlorate, and the alkali may for instance be NaOH, KOH, $K_2CO_3$, or $NaHCO_3$. One specific method of such preparation is disclosed by A. Leprince et (supra). Apart from polymerised iron chloride other polymerised iron substances may, after suitable adaptations, be produced by the method suggested by Leprince et al.

A commonly used parameter in connection with polymerised iron substances is the basicity or the B-value. In the present application the B-value is defined as $[OH]_a/Fe(III)_T]$ where $[OH]_a$ is the molar concentration of base added into the solution in operation, and where $[Fe(III)_T]$ refers to all Fe(III) species in the solution.

In one preferred embodiment of the present invention polymerised iron chloride is produced by mixing a base, preferably NaOH or $NaHCO_3$, with an aqueous solution of $FeCl_3$, preferably concentrated, while stirring vigorously. A concentrated aqueous solution of $FeCl_3$ holds about 4M with regard to Fe. The obtained polymerised iron chloride preferably has a B of up to about 2.5, particularly from about 0.1 to about 0.5. The iron content of the polymerised iron chloride is preferably of from about 1 to about 4, particularly from about 2 to about 3.5.

The present invention is further illustrated below by means of a some non-limiting examples.

EXAMPLE 1

Aqueous solutions of 3.9M $FeCl_3$ and 6.25M NaOH were pumped from storage containers via hoses into a magnetic centrifugal pump of type Argal TM 45, in which the combined solutions were subjected to forceful mixing during which polymerised iron chloride was formed. The FeCl₃ solution was pumped by means of a Watson Marlow 604S hose pump through a 10*16 mm silicon hose, while the NaOH solution was pumped by means of a Watson Marlow 502 hose pump through a 6*9 mm silicon hose. A sample of the combined solutions amounting to 30 μl, corresponding to 104.4 moles of iron, were then added to a beaker holding 0.8 l of wastewater having a turbidity of 55.1 NTU and a phosphor content of 12.1 mg/l. The solution of polymerised iron chloride added to the wastewater were mixed by stirring at 515 rpm for 30 seconds, then flocs were allowed to grow for 10 minutes while stirring at 40 rpm. This was followed by sedimentation of flocs for 10 minutes without stirring. Then samples were obtained from the supernatant and analysed. The turbidity of the samples was measured by means of a HACH 2100P turbidity meter.

In these experiments the FeCl₃ solution was pumped at 40 rpm, giving a flow of 0.9 l/min of FeCl₃ solution, while the NaOH solution was pumped at 25 rpm giving a flow of 0.11 l/min of FeCl₃ solution. This resulted in a polymerised iron chloride solution with a B-value of 0.2 and containing 3.48M of iron. The polymerised iron chloride solution was then pumped by a centrifugal pump via the third hose into the wastewater. The ageing time was controlled by adjusting the length of the third hose.

The ageing times and corresponding values of turbidity are set forth in Table I below.

TABLE I

| Ageing time (minutes) | Turbidity (NTU) |
| --- | --- |
| 0.5 | 3.71 |
| 1 | 3.21 |
| 3 | 3.15 |
| 7 | 3.11 |
| 8 | 3.13 |
| 10 | 3.3 |

EXAMPLE 2

Example 1 was basically repeated, except that in these experiments the NaOH solution was pumped at 16 rpm giving a flow of 0.04 l/min of NaOH solution. This resulted in a polymerised iron chloride solution with a B-value of 0.11 and an iron content of 2.69M. A sample amounting to 40 μl of the solution, corresponding to 107.6 μmoles of iron, was withdrawn and added to a beaker of wastewater as in Example 1. The ortho phosphor content of the wastewater was measured by means of a HACH DR/700 colorimeter. The ageing times and corresponding values of phosphor content are set forth in Table II below.

TABLE II

| Ageing time (minutes) | Ortho phosphor content (mg/l) |
| --- | --- |
| 0.5 | 2.8 |
| 1 | 2.54 |
| 7 | 2.32 |
| 8 | 2.46 |
| 10 | 2.61 |

We claim:

1. Method for treatment of water in which a polymerized iron substance is used as a flocculant, wherein
   an aqueous solution containing a freshly made polymerized iron substance is produced;
   the produced polymerized iron substance is aged sufficiently long to provide for minimal turbidity or minimal phosphor content after treatment of water;
   the aqueous solution containing aged polymerized iron substance is added to the water to be treated to allow flocs and a supernatant to form in said water;
   the turbidity or phosphor content of said supernatant is measured; and
   the ageing of said polymerized iron substance is controlled in response to the measured content.

2. Method according to claim 1, wherein the aqueous solution containing aged polymerized iron substance is added to the water to be treated before said substance starts to precipitate.

3. Method according to claim 1, wherein the polymerized iron substance is produced from iron chloride, iron sulphate, iron chloride sulphate, or a mixture thereof.

4. Method according to claim 1, wherein the aqueous solution of polymerized iron substance contains from about 2M to about 3.5M of Fe.

5. Method according claim 1, wherein the polymerized iron substance has a OH/Fe ratio (B) of about 0.1–0.5.

6. Method according to claim 1, wherein the polymerized iron substance has been prepared by mixing a concentrated FeCl₃ solution with a base under vigorous stirring.

7. Method according to claim 1, wherein the produced polymerized iron substance is aged at least about 15 seconds.

8. Method according to claim 1, wherein the time of ageing is controlled by transporting the aqueous solution of produced polymerized iron substance from the point of production to the water to be treated through a tube or a hose, whereby the flow of the solution and/or the dimensions of said tube or hose are chosen so as to give the desired time of ageing.

* * * * *